United States Patent [19]
Sawamura et al.

[11] Patent Number: 4,637,953
[45] Date of Patent: Jan. 20, 1987

[54] MAGNETOOPTICAL RECORDING MEDIUM WITH LAMINATED ANTI-REFLECTION FILM

[75] Inventors: Mitsuharu Sawamura, Yokohama; Susumo Ito, Tokyo, both of Japan

[73] Assignee: Canon Kabushiki Kaisha, Tokyo, Japan

[21] Appl. No.: 614,761

[22] Filed: May 29, 1984

[30] Foreign Application Priority Data

Jun. 7, 1983 [JP] Japan .................. 58-100247

[51] Int. Cl.$^4$ .............................................. G11B 7/24
[52] U.S. Cl. ..................... 428/333; 350/377; 350/379; 360/131; 428/432; 428/472; 428/694; 428/701; 428/702; 428/900
[58] Field of Search ............. 428/212, 694, 692, 701, 428/702, 900, 333, 432, 472; 365/122; 350/377, 379, DIG. 3; 360/131, 135

[56] References Cited

U.S. PATENT DOCUMENTS

| | | | |
|---|---|---|---|
| 3,472,575 | 10/1969 | Hunt | 350/377 |
| 3,650,601 | 3/1972 | Bierlein | 350/151 |
| 4,390,600 | 6/1983 | Ohta et al. | 428/621 |
| 4,414,650 | 11/1983 | Ohta et al. | 365/122 |
| 4,525,028 | 6/1985 | Dorschner | 350/377 |

OTHER PUBLICATIONS

Taylor et al, "Magnetic Anisotropy in Evaporated Amorphous Films of the Ternary System Gdx (Fe$_{1-y}$Co$_y$)$_{1-x}$", Journ. App. Phy., 98, 358, 1977.
Keay et al; Optica Acta, vol. 15, p. 373 (1968).
Bell et al; Journal of Quantum Elec., vol. 14, p. 487 (1978).
Cuomo et al; IBM Tech. Dis. Bull., vol. 16, p. 1442 (1973).

*Primary Examiner*—George F. Lesmes
*Assistant Examiner*—William M. Atkinson
*Attorney, Agent, or Firm*—Fitzpatrick, Cella, Harper & Scinto

[57] ABSTRACT

A magnetooptical recording medium is provided which comprises (a) a light-transmissive substrate formed of a material selected from the group consisting of plastic and glass, (b) a multilayer film disposed on said light-transmissive substrate, and multilayer film being formed by alternate lamination in three or more odd number of a high-refractive film composed of a high-refractive material and a low-refractive film containing SiO$_2$ as the main constituent and the film in contact with said light-transmissive substrate being a high refractive film, and (c) a recording magnetic layer disposed on said multilayer film, recording on said magnetic film being performed by a light beam transmitting said substrate and said multilayer.

4 Claims, 8 Drawing Figures

MAGNETOOPTICAL RECORDING MEDIUM WITH LAMINATED ANTI-REFLECTION FILM

BACKGROUND OF THE INVENTION

1. Field of the Invention

The present invention relates to a magnetooptical recording medium which performs readouts by utilizing a magnetic Kerr effect, magnetic Faraday effect, and magnetooptical effect. Particularly it relates to a magnetooptical recording medium comprising an antireflection film for improving recording and readout efficiencies.

2. Description of the Prior Art

Amorphous alloy films have hitherto been regarded as being promising from the viewpoint of recording efficiency and readout efficiency. Particularly, a ternary amorhpous alloy film constituted of Gd-Tb-Fe ternary system is a good recording medium because of the low Curie point of about 150° C. and a large Kerr rotation angle. However, it has deficiencies in improving recording sensitivity in a single use of a magnetic recording layer and of improving S/N ratio on reading out. An increase in efficiency has been attempted by selecting a combination of a substrate material, a heat insulation layer, an antireflection film, a reflection-increasing film (for utilizing Faraday effect), and so on.

A monolayer antireflection film disposed on a magnetic film was proposed in Japanese Laid-open Patent Publication No. 156943/1981 etc. However, it has a defect of low refraction coefficient and the concomitant low efficiency caused by the difficulty of heating in film forming processes when glass or plastic is used as an outer medium at the recording side.

The inventors of the present invention previously found a Gd-Tb-Fe-Co quaternary amorphous alloy thin film to be a magnetooptical recording medium having a large Kerr rotation angle and sufficient squareness. This quaternary medium has still has deficiencies in a of high Curie point of approximately 300° C. and low recording efficiency.

SUMMARY OF THE INVENTION

The object of the present invention is to provide a magnetooptical recording medium which eliminates the above-mentioned disadvantages of a conventional magnetooptical recording medium and especially the one comprising said Gd-Tb-Fe-Co quaternary amorphous alloy thin film by providing an antireflection film having the most suitable constitution of layer numbers, layer thicknesses, a refraction coefficient and materials, and which permits the increase of S/N ratio by sufficient antireflection effect, improved record efficiency, and increased Kerr rotation angle (approximately 1° or more).

According to the present invention, there is provided a magnetooptical recording medium which comprises (a) a light-transmissive substrate formed of a material selected from the group consisting of plastic and glass, (b) a multilayer film disposed on said light-transmissive substrate, said multilayer film being formed by alternate lamination in three or more odd number of a high-refractive film composed of a high refractive material and a low-refractive film containing $SiO_2$ as the main constituent and the film in contact with said light-transmissive substrate being a high refractive film, (c) a recording magnetic layer disposed on said multilayer film, recording on said magnetic film being performed by a light beam transmitting said substrate and said multilayer.

DESCRIPTION OF THE PREFERRED EMBODIMENT

Figure 1:
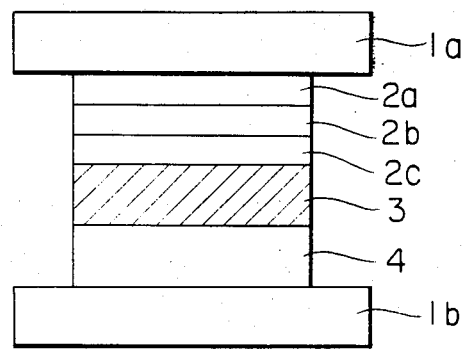
FIGS. 1, 2, 3 and 4 illustrate the constitutions of the magnetooptical recording medium.

In the present invention, a high-refractive film means a film consisting of a substance having a refractive index of not less than 1.80, and a low-refractive film means a film consisting of a substance having a refractive index of not more than 1.60.

As examples of the recording magnetic layer used in the present invention, there are mentioned quaternary amorphous thin films of Gd-Tb-Fe-Co, and ternary amorphous thin films of Gd-Tb-Fe, among which the quaternary magnetic layers are more preferable from the large Kerr rotation angles and satisfactory squareness.

As preferable examples of high-refractive films used in the present invention, there are mentioned a $ZrO_2$ film, a $Ta_2O_5$ film and an $Nb_2O_5$ film having a refractive index of approximately 1.9, 2.0 and 2.1, respectively. A $Ta_2O_5$ film and an $Nb_2O_5$ film will attain the above-mentioned refractive index as vapor-deposited at a room temperature. Accordingly, they are especially suitable in mass production when the said magnetic layer cannot be formed with heating and the antireflection layer has to be formed at about room temperature.

As another preferable example of the high-refractive film, there is a binary vapor-deposited film comprising $Ta_2O_5$ and $ZrO_2$ prepared by mixing, heating, and forming $Ta_2O_5$ powder and $ZrO_2$ powder and vapor-depositing the resulting mixture (hereinafter the film is referred to as a mixed film). When $Ta_2O_5$ film or $Nb_2O_5$ film is vapor-deposited by means of an electron gun to form a film, there may be a danger of producing defects caused by splashing of sintered $Ta_2O_5$ or $Nb_2O_5$ pellet granule on vapor-deposition. However, the use of said mixed film composed of two components $Ta_2O_5$ and $ZrO_2$ not only gives the refractive index equivalent to that of $Ta_2O_5$ film but also can prevent almost entirely the splashing that is peculiar to $Ta_2O_5$ pellet on vapor-depositing. In the mixed film of $Ta_2O_5/ZrO_2=3/1$ (mole ratio) vapor-deposited at a room temperature has a refractive index of approximately 1.99, and the splashing at the vapor-deposition is not observed.

As the other preferable example of the high-refractive film of the present invention, there may be mentioned a mixed film comprising two components, $Nb_2O_5$ and $ZrO_2$ prepared by mixing, heating, and forming $Nb_2O_5$ powder and $ZrO_2$ powder and vapor-depositing the resulting mixture. This mixed film can be prepared without splashing and with significantly reduced percentage of defects caused by splashed pellet granules, resulting in a refractive index approximately equal to the $Nb_2O_5$ film. For example, a mixed film of $Nb_2O_5/ZrO_2=3/1$ (mole ratio) has a refractive index of 2.1 which can be formed almost without the splashing of depositing material on vapor-deposition.

As a low-refractive film of the present invention, there is used a film containing $SiO_2$ as the main constituent. Although fluoride film or oxide film is used generally for a low-refractive film, an $MgF_2$ film which is a representative of the fluoride films, when used as a low-refractive film, causes rapid deterioration of magnetic characteristics and appearance of the magnetic layer, and further, film cracking, film floating, and light scattering are caused in forming an antireflection film adjacent to an organic heat insulation layer. On the other hand, the film containing $SiO_2$ as the main component is superior in surface strength and adherence, and free from formation of film crackings and film floatings. An example of the above-mentioned film that comprises $SiO_2$ as the main constituent is the one prepared by using Schott 8329 (Trade Name, supplied by Schott Co.) as a vapor depositing substance and constituted with approximately 70% of $SiO_2$ and the balance of boron oxide and aluminum oxide.

The antireflection film used in the present invention is constituted by laminating the above-mentioned high-refractive films and the above-mentioned low-refractive films alternately beginning with the high-refractive film from writing side to obtain a lamination of odd number of layers of at least three, preferably three or five and it is disposed between the outer medium at the writing side and said recording magnetic layer.

The film thickness of each layer constituting the antireflection film of the present invention is, in three layer lamination, optically $\lambda/4$ relative to recording and reading-out wave length for the first and second layers, and less than $\lambda/4$ optically for the third layer in consideration of phase shift on reflection at the interface of the recording magnetic layer, and in five layer lamination, they are preferably $\lambda/4$ for the first to fourth layers and less than $\lambda/4$ for fifth layer as in the three layer lamination.

The antireflection film of the present invention is advantageously constituted of alternate layers of optical film thicknesses of $\lambda/4$, and it is preferable to choose the refractive index as a parameter for varying the reflectivity.

An embodiment of the present invention is explained in reference to FIG. 1, which illustrates schematically the constitution of the magnetooptical recording medium of the present invention. In FIG. 1, a high-refractive film 2a of $ZrO_2$, a low-refractive film 2b containing $SiO_2$ as the main constituent, and a $ZrO_2$ film 2c are disposed in this order from the writing side on a glass or plastic substrate 1a, and further a Gd-Tb-Fe-Co quaternary amorphous recording magnetic layer 3 are formed thereon, and then it is made adherent through an adhesion layer 4 with a glass or plastic substrate 1b to obtain a magnetooptical recording medium of the present invention. In FIG. 1, three layers of 2a, 2b and 2c constitute an antireflection film. The thicknesses of a $ZrO_2$ film 2a of the first layer and a film 2b of the second layer containing $SiO_2$ as the main constituent are made to be optically $\lambda/4$ relative to the wave lengths of the recording and reading-out light beam, and the thickness of the $ZrO_2$ film 2c of the third layer is made to be less than $\lambda/4$ optically considering the phase shift by reflection at the interface of the magnetic layer 3. Namely the refractive indices of layers 2a, 2b and 2c constituting an antireflection film for the applied wave length of approximately 800 nm is 1.9, 1.48 and 1.9 respectively and the optical film thicknesses are 200 nm, 200 nm and 160 nm, respectively.

Figure 3:
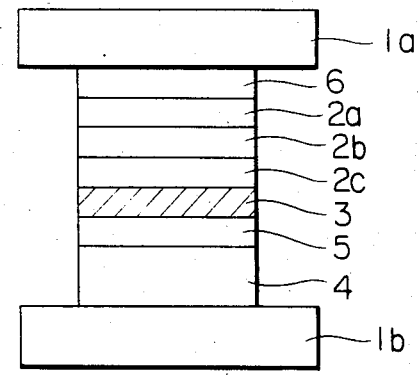

In the constitution of the medium of this embodiment, there may be provided a heat insulation layer 6 composed of an organic resin between a glass substrate 1a and the three-layer antireflection film (2a, 2b and 2c), and further a protection layer 5 may be provided. Such construction is schematically shown in FIG. 3.

Figure 2:
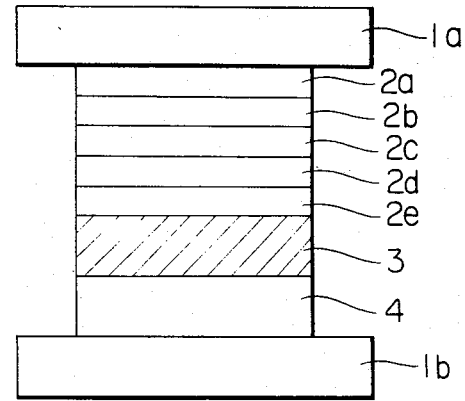

Referring now to FIG. 2 which shows schematically the constitution of the magnetooptical recording medium of the present invention, the other embodiment is explained below. A magnetooptical recording medium is prepared in the same manner as in FIG. 1 except that the antireflection film is constituted of five layers including a $ZrO_2$ film 2a, a film 2b containing $SiO_2$ as the main constituent, a $ZrO_2$ film 2c, a film 2d comprising $SiO_2$ as the main constituent, and a $ZrO_2$ film 2e. The refractive indices of layers 2a, 2b, 2c, 2d and 2e are 1.9, 1.48, 1.9, 1.48 and 1.9 respectively for the applied wave length of approximately 800 nm, and the optical film thicknesses thereof are 200 nm, 200 nm, 200 nm, 200 nm and 160 nm, respectively.

Figure 4:
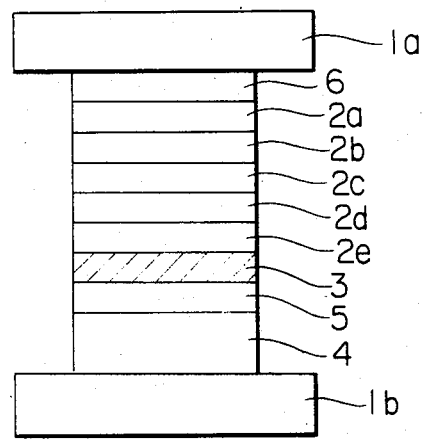

In this embodiment, a heat-insulation layer 6 constituted by an organic resin may be provided between the glass substrate 1a and the five-layer antireflection film, and further a protection layer 5 may be provided between the magnetic layer 3 and the adhesion layer 4. FIG. 4 illustrates such constitution.

In the magnetooptical recording medium of the present invention, a three-layer or five-layer reflection-preventing film based on $\lambda/4$ optical thickness provided between a quaternary Gd-Tb-Fe-Co recording magnetic layer and a glass or plastic substrate may achieve a reflectance of 10% or less, and may improve the recording and readout efficiencies.

A $ZrO_2$ film, a $Ta_2O_5$ film, or a $Nb_2O_5$ film used for a high-refractive layer in the magnetooptical recording medium of the present invention may make the reflectance for optical wave length of approximately 800 nm to be in a range of approximately 1% to 12%, giving the desired antireflection effect.

In the magnetooptical recording medium of the present invention, use of a film containing $SiO_2$ as the main constituent for the low-refractive film may improve the surface strength and adhesion of the antireflection film to facilitate the formation of recording magnetic film on the antireflection film.

In the magnetooptical recording medium of the present invention, use of a two-component mixed film formed by electron-gun-vapor-deposition of $Ta_2O_5$ and $ZrO_2$ for a high-refractive layer may exhibit an antireflection effect equivalent to the one obtained from a $Ta_2O_5$ film, and simultaneously reduce considerably the defect caused by splashed granules of the vapor depositing material on vapor deposition. The similar effect may be obtained when mixture of $Nb_2O_5$ and $ZrO_2$ is used as a material in place of a mixture of $Ta_2O_5$ and $ZrO_2$.

This invention is further explained with the Examples below:

EXAMPLE 1

Figure 5:
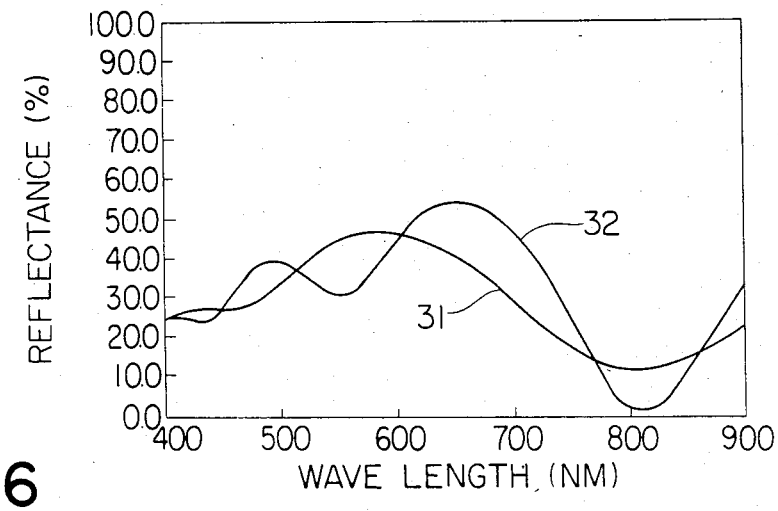
FIGS. 5, 6, 7 and 8 illustrate the spectral reflectance curves of the magnetooptical recording medium of the present invention.

The magnetooptical recording medium shown in FIGS. 1 and 2 gave spectral reflection curves 31 and 32 respectively shown in FIG. 5. Without the antireflection film, the reflectance and the Kerr rotation angle at the recording magnetic layer were approximately 45% and approximately 0.4° respectively, neither the record nor readout efficiencies being satisfactory, while with the antireflection film illustrated in FIGS. 1 and 2, the reflectance at 800 nm was approximately 12% and approximately 2% respectively and the recording and readout efficiencies were satisfactory.

EXAMPLE 2

Figure 6:
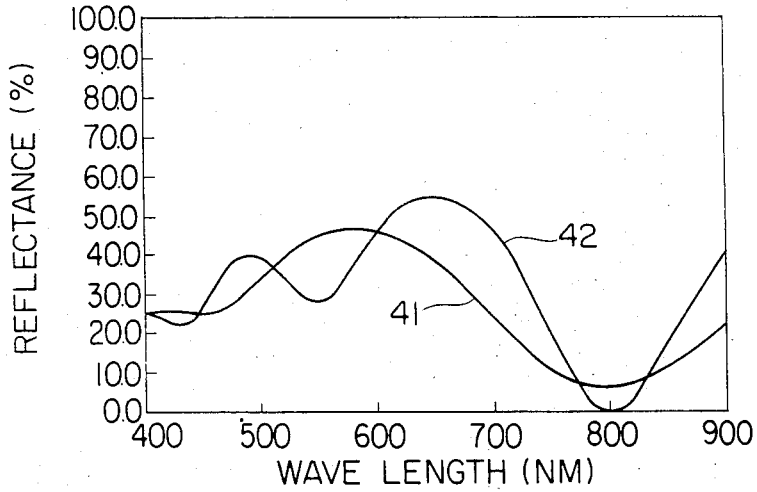

A magnetooptical recording medium having the constitution similar to those shown in FIGS. 1 and 2 were prepared except that $Ta_2O_5$ films were used as the high-refractive films instead of $ZrO_2$ films. This recording medium gave spectral reflectance curves 41 and 42 shown in FIG. 6, respectively. The curves 41 and 42 demonstrate the reflectance of approximately 6% and 1% or less at approximately 800 nm, implying excellent recording and readout efficiencies.

EXAMPLE 3

Figure 7:
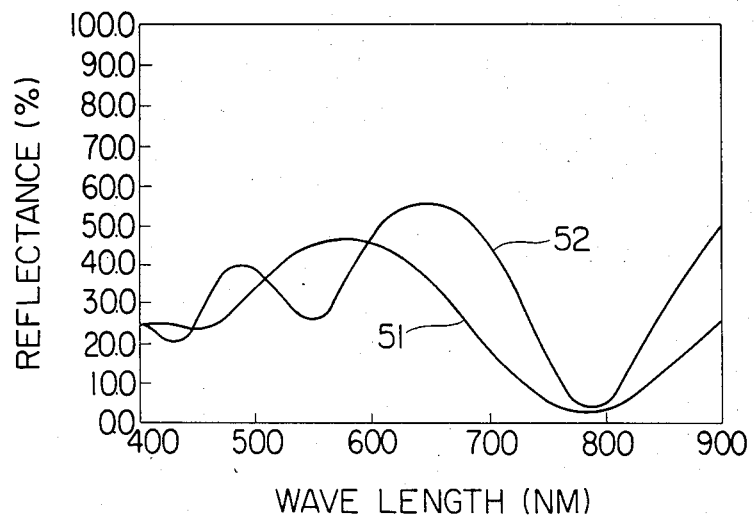

A photomagnetic recording medium having the constitution similar to those shown in FIGS. 1 and 2 were prepared, except that $Nb_2O_5$ films were used in place of $ZrO_2$ films. This recording medium gave the spectral reflectance curves 51 and 52 as shown in FIG. 7. The curves 51 and 52 show that the reflectances were approximately 3% and 4% for the applied wave length of 800 nm and recording and readout efficiencies were both satisfactory.

The comparison of curves 51 and 52 in Example 3 shows that the increase in the number of layers from three five will raise the reflectance. Moreover, the comparison of curve 42 in Example 2 and the curve 52 in Example 3 shows that the increase of refractive index from 2.0 to 2.1 causes the rise of the reflectance. Therefore, as described above, in the magnetooptical recording medium of the present invention, the constitution is preferable in which the reflectance is maintained in a desired range, i.e. approximately 1–10%; a film containing $SiO_2$ as the main constituent is used as a low-refractive film; a $ZrO_2$ film as a high-refractive film, a $Ta_2O_5$ film, or an $Nb_2O_5$ film are used each separately or in combination as mentioned above; the antireflection film has a multilayer structure of three or five layer.

EXAMPLE 4

Figure 8:
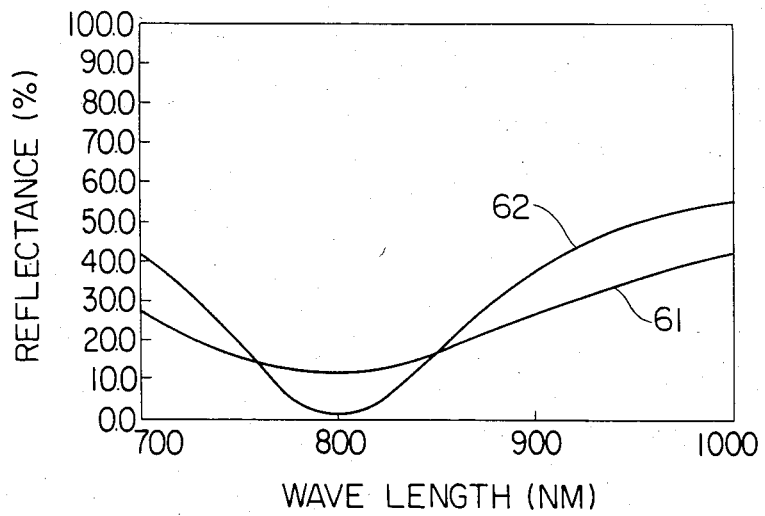

The magnetooptical recording medium illustrated in FIGS. 3 and 4 gave spectral reflectance curves 61 and 62 as shown in FIG. 8. Further, the heat insulation layer 5 had a refractive index of approximately 1.63 and the film thickness of $\lambda/2$ in respect to the applied wave length 800 nm. The curves 61 and 62 both gave a sufficient antireflection effect.

What we claim is:

1. A magnetooptical recording medium comprising:
  (a) a light transmissive substrate formed of a material selected from the group consisting of plastic and glass;
  (b) a multilayer film disposed on said light-transmissive substrate, said multilayer film having an odd number of layers of at least 3 in number and being formed by alternate lamination of a high-refractive film which is a binary vapor-deposited film comprising a mixture of $Ta_2O_5$ and $ZrO_2$, and a low-refractive film containing $SiO_2$ as the main constitutent and the film in contact with said light-tramissive substrate being a high refractive film, wherein each of the layers of said multilayer film has an optical thickness of $\lambda/4$, where $\lambda$ is a wave length of recording and readout light; and
  (c) a recording magnetic layer disposed on said multilayer film wherein recording on said magnetic film is performed by a light beam traversing said substrate and said multilayer.

2. The magnetooptical recording medium according to claim 1, in which said magnetic recording layer is a quaternary amorphous thin film comprising Gd-Tb-Fe-Co.

3. A magnetooptical recording medium comprising:
  (a) a light transmissive substrate formed of a material selected from the group consisting of plastic and glass;
  (b) a multilayer film disposed on said light-transmissive substrate, said multilayer film having an odd number of layers of at least 3 in number and being formed by alternate lamination of a high-refractive film which is a binary vapor-deposited film comprising a mixture of $Nb_2O_5$ and $ZrO_2$, and a low-refractive film contaiing $SiO_2$ as the main constituent and film in contact with said light-transmissive substrate being a high refractive film, wherein each of the layers of said multilayer film has an optical thickness of $\lambda/4$, where $\lambda$ is a wave length of recording and readoug light; and
  (c) a recording magnetic layer disposed on said multilayer film wherein recording on said magnetic film is performed by a light beam traversing said substrate and said multilayer.

4. The magnetooptical recording medium according to claim 3 in which said magnetic recording layer is a quaternary amorphous thin film comprising Gd-Tb-Fe-Co.

* * * * *